United States Patent
Narayanan et al.

(10) Patent No.: US 11,137,751 B2
(45) Date of Patent: Oct. 5, 2021

(54) SYSTEM, APPARATUS, AND METHOD FOR ESTIMATING LIFE OF COMPONENTS

(71) Applicants: Sankar Narayanan, Bengaluru (IN); Santosh B. Narasimhachary, Charlotte, NC (US); Kai Kadau, Lake Wylie, SC (US); Sachin R. Shinde, Oviedo, FL (US)

(72) Inventors: Sankar Narayanan, Bengaluru (IN); Santosh B. Narasimhachary, Charlotte, NC (US); Kai Kadau, Lake Wylie, SC (US); Sachin R. Shinde, Oviedo, FL (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/674,886

(22) Filed: Nov. 5, 2019

(65) Prior Publication Data

US 2021/0132599 A1 May 6, 2021

(51) Int. Cl.
 *G05B 23/02* (2006.01)
 *F01D 21/00* (2006.01)
 *G01N 25/72* (2006.01)

(52) U.S. Cl.
 CPC ....... *G05B 23/0283* (2013.01); *F01D 21/003* (2013.01); *G01N 25/72* (2013.01); *G05B 23/0254* (2013.01)

(58) Field of Classification Search
 CPC ............ G05B 23/0283; G05B 23/0254; F01D 21/003; G01N 25/72; G06F 11/008

(Continued)

(56) References Cited

U.S. PATENT DOCUMENTS 7,016,825 B1 * 3/2006 Tryon, III ............... G06F 30/23
 703/6
8,285,522 B1 * 10/2012 Tryon, III ............... G06F 30/23
 703/2

(Continued)

OTHER PUBLICATIONS

Palmert, Frans et al., "Thermomechanical fatigue crack growth in a single crystal nickel base superalloy"; International Journal of Fatigue; vol. 122; May 1, 2019; pp. 184-198.

(Continued)

*Primary Examiner* — John H Le
(74) *Attorney, Agent, or Firm* — Lempia Summerfield Katz LLC

(57) ABSTRACT

A method for estimating life of a component includes obtaining fracture data corresponding to a component. The fracture data includes a first dataset corresponding to a threshold region where the crack in the component is dormant below a fatigue threshold. The method further includes determining initial estimates of parameters of a crack growth rate model and parameters of temperature models corresponding to the crack growth rate model based on the fracture data. The method also includes computing optimized parameters of temperature models corresponding to the crack growth rate model, and a scatter parameter via simulation of a joint optimization method using the initial estimates. The method includes determining a cumulative distribution function based on the optimized parameters and the scatter parameter and estimating life of the component based on the cumulative distribution function.

18 Claims, 10 Drawing Sheets

| 100 | System | 110 | Apparatus | 120 | Optimizer Unit |
| 102 | Stress Test Setup | 112 | Data Acquisition Unit | 122 | Communications Bus |
| 104 | Test-specimen | 114 | Memory Unit | 124 | Specifications Data |
| 106 | Sensors | 116 | Control Unit | 126 | Design of Components |
| 108 | Fracture Data | 118 | Initialization Unit | 128 | First Dataset |
| | | | | 130 | Second Dataset |

(58) Field of Classification Search
USPC .................. 702/34, 35, 184, 185; 703/2, 13
See application file for complete search history.

(56) References Cited

U.S. PATENT DOCUMENTS

| | | | |
|---|---|---|---|
| 8,290,753 B2* | 10/2012 | Tryon, III | G06F 11/008 |
| | | | 703/2 |
| 8,725,456 B1* | 5/2014 | Saha | G05B 23/0283 |
| | | | 702/181 |
| 9,280,620 B2 | 3/2016 | Amann | |
| 9,792,555 B2* | 10/2017 | Guan | G01N 29/4472 |
| 2008/0015827 A1* | 1/2008 | Tryon, III | G06F 11/008 |
| | | | 703/2 |
| 2014/0107948 A1* | 4/2014 | Amann | G01B 5/30 |
| | | | 702/35 |

OTHER PUBLICATIONS

NASGRO: "NASGRO v6.2 Release Notes NASFLA Additions and Changes New Stress Intensity Factor Models (also in NASSIF and NASCCS)"; Sep. 29, 2011; XP055788313; URL: https://member-nasgro.swri.org/system/tdf/nasgro v6.2 release notes.pdf [retrieved on Mar. 22, 2021]; 2011.

Paolino D.S. et al., "Sigmoidal crack growth rate curve: statistical modelling and applications : SIGMOIDAL CRACK—Growth-Rate Curve"; Fatigue and Fracture of Engineering Materials and Structures.; vol. 36; No. 4; Sep. 28, 2012; pp. 316-326.

Extended European Search Report for related European Patent Application No. 20205988.7, dated Apr. 4, 2021, 12 pages.

* cited by examiner

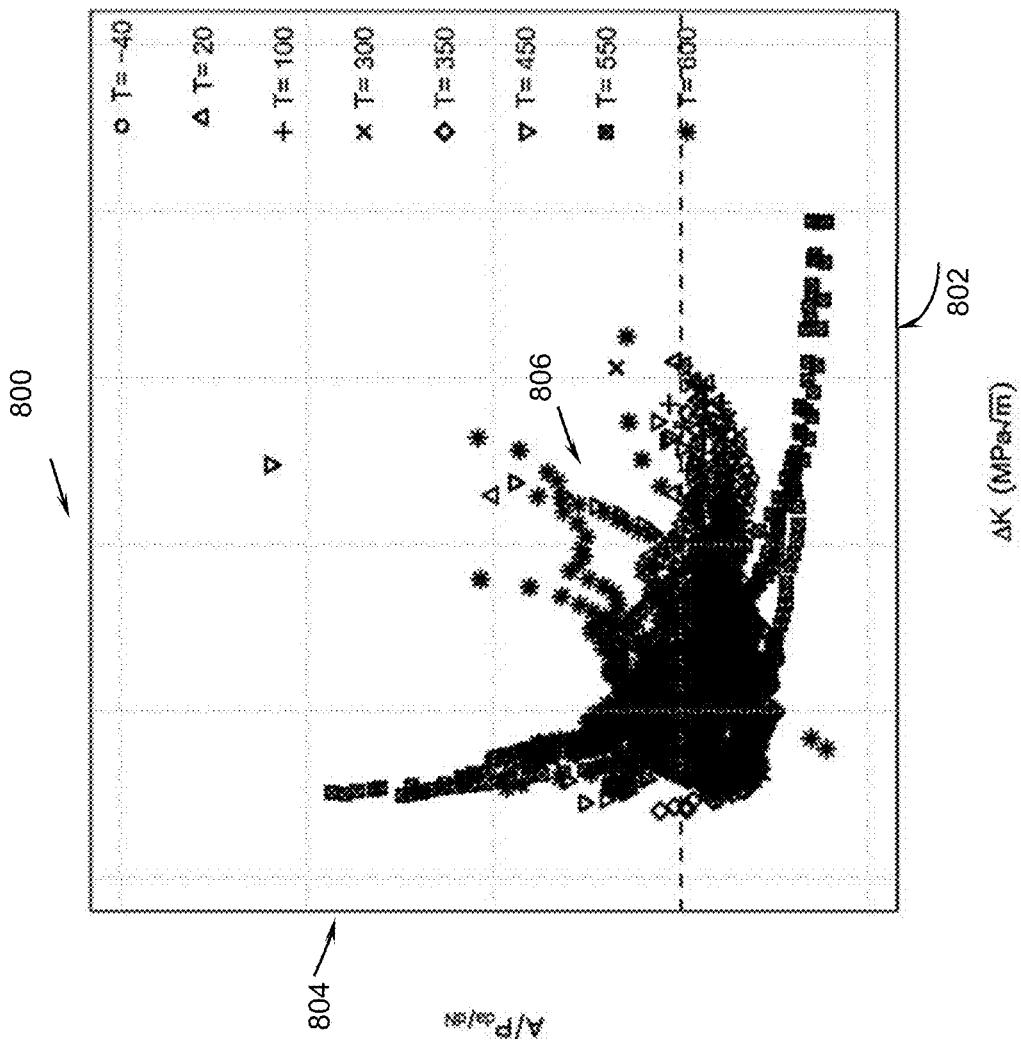
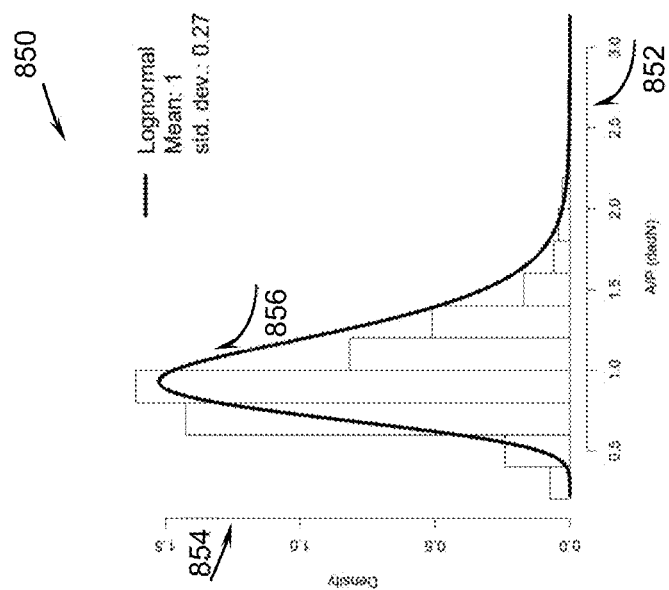
FIG. 8A
FIG. 8B

SYSTEM, APPARATUS, AND METHOD FOR ESTIMATING LIFE OF COMPONENTS

TECHNICAL FIELD

Embodiments of the present specification relate generally to prediction of life of components of a machine, and more particularly to systems and methods for accurately modeling material properties enabling precise estimation of end of life of the components of the machine.

BACKGROUND

Electromechanical machines, such as gas turbines and their constituent components may be subjected to mechanical and thermal stresses. Mechanical stresses include compressive, tensile, or other type of forces. Thermal stresses occur due to temperature changes experienced by the systems. Such forces may be cyclical, constant, or varying with reference to time. As an example, the components in a gas turbine experience cyclic mechanical and thermal stresses, especially during starting or shut down. Such stresses results in material fatigue and may create cracks within the components or propagate existing cracks over a period of time. Material flaws inherent in the components may also influence creation and/or propagation of cracks that limit the life of the components.

Effective estimation of life of a component requires assessment of the growth rate of cracks. Typically, linear elastic fracture mechanics (LEFM) and finite element analyses (FEA) are used for estimating a transient stress field to which the component is subjected. However, such an analysis is not effective due to the uncertainties associated with material properties and initial flaw size. The analysis for estimating life of a component or design parameters obtained from specifications may be extremely conservative. As a result of this conservative approach, components are being prematurely serviced or taken out of service. Such premature service intervals or component replacements may add significantly to system cost.

Fatigue crack life calculations may be performed using either a deterministic or a probabilistic approach. Deterministic approach is inherently conservative in nature as extreme values of only a few representative cases are considered for estimating end of life of components. The probabilistic methods and statistics may utilize fracture mechanics calculations based on flaw-size distributions and component inspection intervals. The probabilistic approach may permit the design of lower cost components with expanded operating conditions and/or longer service lifetime than permitted by the deterministic approach.

State of the art probabilistic fracture mechanics methodologies used for component design and re-certification purposes accounts for the uncertainty in the material properties related to fracture. Probabilistic-Fracture-Mechanics (ProbFM) tool disclosed in U.S. Pat. No. 9,280,620 B2 is an example methodology that predicts life values based on the uncertainties (or scatter) in material properties. Fracture mechanics and reliability assessment that supports damage tolerant design and analysis of metallic structural components need to account for the uncertainty in the material properties related to fracture. The magnitude of the material-scatter is estimated from fitting the appropriate empirical models to material data. Much care and rigor are warranted while estimating the scatter from the material properties. The scatter values will in turn depend on formulation of models used for fitting the data. The conventional method of fitting mathematical models to the data is via least-squares regression (LSR). However, LSR is theoretically correct when the scatter in the data follows a normal distribution (Gaussian scatter). In reality, several of the material data sets associated with the gas turbine components, have been found to follow non-normal distributions like Weibull distribution and lognormal distribution. Thus, there is an inherent inaccuracy in modeling the fracture data using least-squares regression technique. There is a need to adopt a more accurate modeling scheme so that the resulting scatter may be useful for enhancing the quality of life-value prediction.

SUMMARY AND DESCRIPTION

Therefore, it is an object of the present disclosure to provide a system, an apparatus and a method for estimating life of components. The object of the present disclosure is achieved by optimizing the crack growth rate model and associated temperature models using a joint optimization method and using the resulting scatter parameter to estimate life of the components.

The phrase "stress test" used herein refers to application of cyclical mechanical stress (and/or thermal stress) to a test-specimen corresponding to a component and measuring crack lengths in the test-specimen. The phrase "fracture data" refers to data acquired by the sensors during the crack test. The component (or the test-specimen corresponding to the component) may exhibit an initial "threshold phase" where crack is introduced and/or propagates very slowly and a subsequent "crack growth phase" where crack propagates without affecting the usage of the component. The fracture data obtained during the threshold phase is referred herein as "threshold data." The fracture data obtained during the crack resistance phase is referred herein as "crack growth data." The fracture data may be represented by a curve in a graph of crack growth rate v/s stress intensity factor range. The curve is obtained by fitting a crack growth rate model to the crack growth rate data. The threshold phase and the crack growth phase are represented as disjoint portions on the curve. The region on the curve corresponding to the threshold phase is referred as "threshold region" and the region on the curve corresponding to the crack resistance phase is also referred to as "fatigue crack growth region" in the subsequent paragraphs. The phrase "Paris region" is used equivalently and interchangeably with the phrase "fatigue crack growth region" in the subsequent paragraphs.

The object of the present disclosure is achieved by a method, an apparatus and a system for estimating life of a component. In accordance with one embodiment, the method provided herein for estimating life of a component includes obtaining fracture data corresponding to a component. The fracture data includes first dataset corresponding to a threshold region where the crack in the component is dormant below a fatigue threshold. The fracture data is representative of crack growth rate in the component as a function of stress intensity factor range for a plurality of temperature values and a plurality of stress ratio values. The method further includes determining initial estimates of parameters of a crack growth rate model and parameters of temperature models corresponding to the crack growth rate model based on the fracture data. The method also includes computing optimized parameters of temperature models corresponding to the crack growth rate model, and a scatter parameter via simulation of a joint optimization method using the initial estimates. The method includes determining a cumulative distribution function based on the optimized parameters and the scatter parameter. The cumulative distribution function is representative of a probability of failure. The method also includes estimating life of the component based on the cumulative distribution function.

The fracture data is obtained by performing stress tests (or fracture tests) on a test-specimen of the component of machine. The test-specimen is a sample material of the component. In an alternate embodiment, the fracture data may be obtained by performing fatigue crack growth simulation using a finite element method. One or more sensors (such as displacement sensors, pressure sensors, and/or stress gauges) are used to sense the signals generated during stress tests. The method includes generating crack growth model such as, but not limited to NASGRO model using the fracture data. The crack growth model includes a threshold model. The threshold model is determined based on threshold data extracted from the fracture data. The threshold data corresponds to the condition of stress tests when the crack in the test-specimen is dormant below a fatigue threshold. The crack growth rate is estimated using the crack growth rate model. Further, a scatter parameter, which is a measure of uncertainty of residuals determined based on the estimated and measured crack growth rates is determined. The scatter parameter is further used in a probabilistic quantification of life of the component.

In one embodiment, one or more parameters of the threshold model, one or more parameters of the crack growth model is modeled as a function of temperature. The threshold model and the parameters of the temperature models corresponding to the threshold model are determined in an optimal manner using the threshold data. Further, the crack growth model and the parameters of the temperature models corresponding to the crack growth model are determined in an optimal manner using the fracture data. In the process of the determination of the crack growth model, optimum threshold models and the corresponding temperature models are also utilized. The scatter parameter obtained from the optimized crack growth rate model is used in a probabilistic quantification of life of the component.

In one embodiment, a polynomial model is used as temperature model for at least one parameter of the threshold model and the crack growth rate model. The order of the polynomial is determined based on best fit of the polynomial model to the data. Specifically, the order of a temperature model for one of the parameters of the threshold model is determined based on best fit of the threshold model to the threshold data. Similarly, the order of a temperature model for one of the parameters of the crack growth rate model is determined based on best fit of the crack growth rate model to the fracture data. In general, a first polynomial model is used to model the threshold stress intensity factor range parameter at a constant fatigue loading and a second polynomial model is used to model an empirical fit constant with positive R ratio. A third polynomial model is used to model the intercept parameter, a fourth polynomial model is used to model the slope parameter, and a fifth polynomial model is used to model the shape modifier parameter for the threshold region.

Specifically, in one embodiment, a second order polynomial and zeroth order polynomial are used as temperature models in the threshold model. Specifically, a second order polynomial is used to model the threshold stress intensity factor range parameter at a constant fatigue loading represented by the first polynomial model. A zeroth order polynomial is used for the empirical fit constant with positive R ratio represented by the second polynomial model. Similarly, in the crack growth rate model, linear models and a zeroth order polynomial models are used as temperature models. Specifically, the linear models are used for the intercept parameter and the slope parameters represented by the third polynomial model and the fourth polynomial model respectively. A zeroth order polynomial is used for shape modifier parameter for the threshold region represented by the fifth polynomial model.

In accordance with another aspect, an apparatus for estimating life of a component is disclosed. The apparatus includes one or more processing units and a memory unit communicatively coupled to the one or more processing units. The memory unit includes one or more code modules stored in the form of machine-readable instructions executable by the one or more processing units. The one or more code modules are configured to perform acts of the method for estimating life of a component disclosed in previous paragraphs.

In one embodiment, one or more processors of the apparatus include a data acquisition unit, a control unit, a model initialization unit and an optimizer unit. The apparatus also includes a memory unit communicatively coupled to the data acquisition unit and configured to store the fracture data. The data acquisition unit is communicatively coupled to a fracture test unit and configured to obtaining fracture data corresponding to a component. The fracture data includes first dataset corresponding to a threshold region where the crack in the component is dormant below a fatigue threshold. The fracture data is representative of crack growth rate in the component as a function of stress intensity factor range for a plurality of temperature values and a plurality of stress ratio values. The memory unit is communicatively coupled to the data acquisition unit and configured to store the fracture data. The model initialization unit is communicatively coupled to the memory unit and configured to determine initial estimates of parameters of a crack growth rate model and parameters of temperature models corresponding to the crack growth rate model based on the fracture data. The optimizer unit is communicatively coupled to the model initialization unit and configured to compute optimized parameters of temperature models corresponding to the crack growth rate model, and a scatter parameter via simulation of a joint optimization method using the initial estimates. The optimizer unit is further configured to determine a cumulative distribution function based on the optimized parameters and the scatter parameter. The cumulative distribution function is representative of a probability of failure. The control unit is communicatively coupled to the memory unit and configured to access memory locations for storing data to and retrieving data from the memory unit. The control unit is also communicatively coupled to the optimizer unit and configured to estimate life of the component based on the cumulative distribution function.

In accordance with another aspect of the present specification, a system for estimating life of a component is disclosed. The system includes one or more sources capable of providing fracture data corresponding to the component. The system further includes an apparatus communicatively coupled to the one or more sources and configured to estimate a life of the component based on the fracture data, as disclosed in the previous paragraph.

In accordance with yet another aspect, a computer-program product storing machine-readable instructions is disclosed. The computer-program when executed by one or more processing units, causes the processing units to perform the acts of the method for estimating life of the component as disclosed in previous paragraphs.

Advantageously, the present disclosure employs maximum likelihood estimates which are statistically robust for fitting data, especially when the inherent scatter has non-Gaussian distribution. The present disclosure also employs temperature models in conjunction with the fracture data models to enhance confidence of the estimates of the fitted parameters. The present disclosure is able to model curves representative of fracture data that do not cross between each other.

BRIEF DESCRIPTION OF THE DRAWINGS

The above-mentioned attributes, features, and advantages of this disclosure and the manner of achieving them, will become more apparent and understandable with the following description of embodiments in conjunction with the corresponding drawings, wherein:

FIG. 8A is a graph illustrating residual as a function of stress intensity factor range in accordance with an exemplary embodiment; and FIG. 8B is a graph illustrating a log-normal distribution model for the residuals determined based on the model of FIG. 4A determined in accordance with an exemplary embodiment.

DETAILED DESCRIPTION

As will be described in detail hereinafter, disclosed systems and methods predict life of components of a system, and more particularly model material properties accurately enabling precise estimation of end of life of the components of the system.

Figure 1:
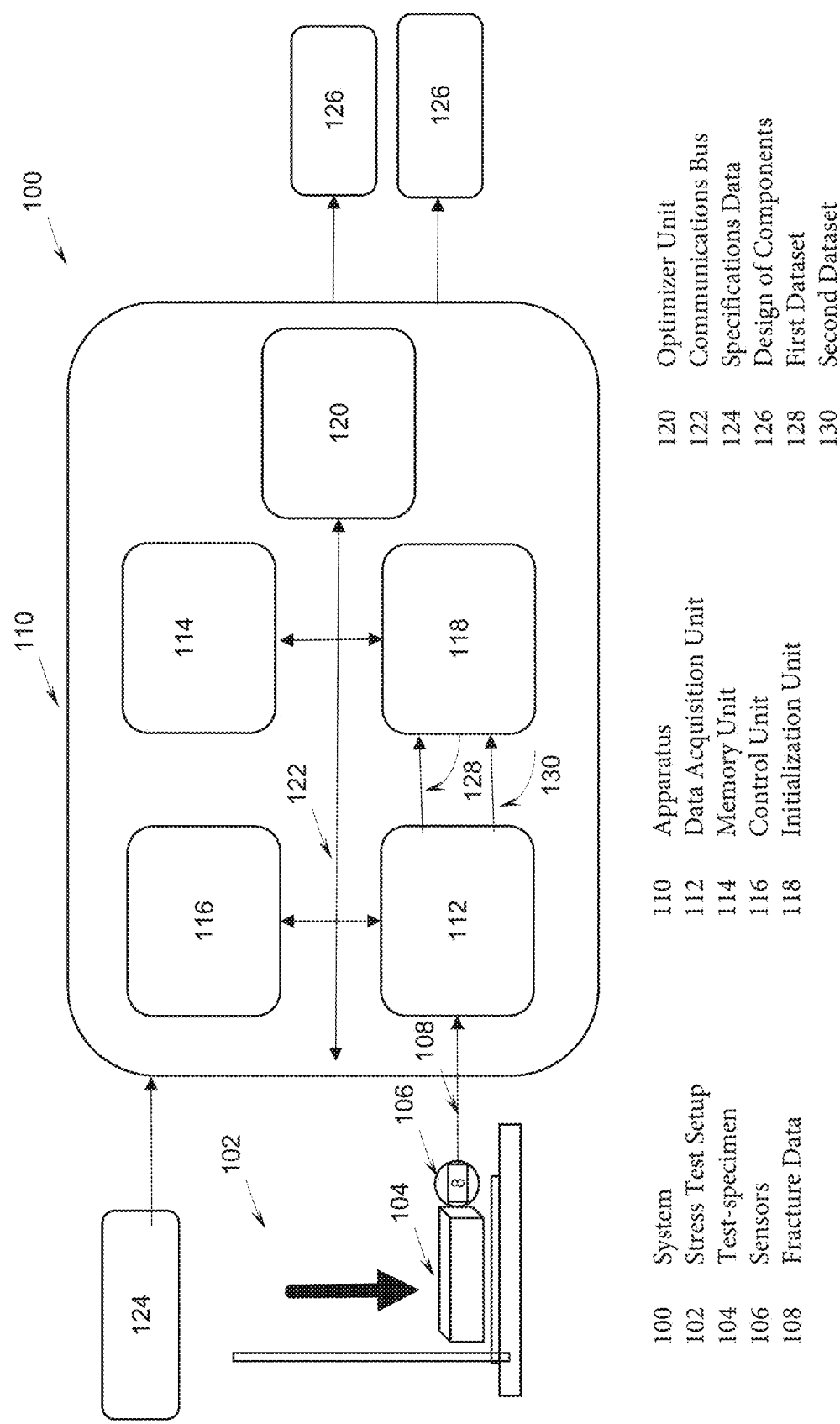
FIG. 1 is a diagrammatic illustration of a system for estimating life of a component in accordance with an exemplary embodiment.

FIG. 1 is a diagrammatic illustration of a system 100 for designing 126 of components using fracture mechanics techniques in accordance with aspects of present specification. The system 100 may also be used for recertification 128 of components for statutory purposes. The system 100 includes a stress test setup 102 configured to perform stress tests on a test-specimen 104 corresponding to a component of a system (not shown in FIG. 1). One or more sensors 106 disposed on in the test setup 102 are used to sense the signals generated during stress tests to generate fracture data 108. The system 100 also includes an apparatus 110 used for fracture mechanics analysis using the fracture data 108. The apparatus 110 is also configured to receive specifications data 124 and other related data required to perform fracture mechanics analysis and life estimation of component from a user or from other sources. The apparatus 110 is further configured to generate crack growth model such as, but not limited to NASGRO model via a joint optimization technique using the fracture data. The optimization technique is based on a maximum likelihood technique using a joint cost function of parameters of the crack growth rate model and the temperature model. The apparatus 110 is configured to generate an optimized scatter parameter via the joint optimization technique. The scatter parameter may be used to generate precise life estimation for the component 104 under consideration.

In the illustrated embodiment, the apparatus 110 includes a data acquisition unit 112, a memory unit 114, a control unit 116, a model initialization unit 118, an optimizer unit 120 communicatively coupled with each other via a communications bus 122.

The data acquisition unit 112 is communicatively coupled to the stress test setup 102 and configured to acquire fracture data corresponding to a component of a system. One or more test-specimen representative of the component at different crack lengths is used in the stress test setup 102 to generate the fracture data. The fracture testing is performed at a plurality of temperatures to generate fracture data corresponding to the plurality of temperatures. In one embodiment, the fracture data generated from a test-specimen is measured via at least one sensor such as, but not limited to, a strain gauge sensor, a pressure sensor and a displacement sensor. The data acquisition unit 112 is configured to interface with the at least one sensor and receive the fracture data. A portion of the fracture data corresponding to the threshold region is referred herein as a first dataset and is represented by numeral 128. Another portion of the fracture data corresponding to the fatigue crack growth region is referred herein as a second dataset and is represented by numeral 130. In one embodiment, the first dataset 128 and the second dataset 130 are extracted from the acquired fracture data.

The memory unit 114 is communicatively coupled to the data acquisition unit 112 and configured to store fracture data acquired by the data acquisition unit 112. The memory unit 114 is also configured to store the first dataset 128 and the second dataset 130 extracted from the fracture data 108. The memory unit 114 is further configured to store threshold model representative of the first dataset 128 and the crack growth rate model representative of the second dataset 130. Specifically, the memory unit 114 is configured to store threshold model generated by the model initialization unit and optimized parameters generated by the optimizer unit 120.

In one embodiment, the memory unit 114 includes one or more of random-access memory (RAM) modules, read only memory (ROM) modules, erasable ROM (EROM) modules, and programmable EROM (PROM) modules. The memory unit 114 may also include solid state drive-based memory modules. It may be noted that some of these memory modules may be part of units 112, 116, 118, 120 of the fracture mechanics apparatus 110.

The model initialization unit 118 is communicatively coupled to the memory unit 114 and configured to determine initial estimates of parameters of a crack growth rate model and parameters of temperature models corresponding to the crack growth rate model based on the fracture data 108. Specifically, the model initialization unit 118 is configured to determine a least squares solution for parameters of a threshold model based on the first dataset 128. The model initialization unit 118 is also configured to determine a least square solution for parameters of temperature models corresponding to the threshold model based on the first dataset. Further, the model initialization unit 118 is configured to determine a maximum likelihood estimation of the parameters of the temperature models corresponding to the threshold model. The model initialization unit 118 is also configured to determine least squares solution for the crack growth rate model based on the fracture data. In one embodiment, the model initialization unit 118 is configured to determine a NASGRO model as crack growth rate model.

The model initialization unit 118 is configured to fit a threshold model to the first dataset 128 and a crack growth rate model to the fracture data 108. Specifically, the model initialization unit 118 is configured to fit a threshold model to the first dataset 128 at each temperature value using a least square technique. Then parameters of temperature models corresponding to the threshold model are determined by the model initialization unit 118 based on least square threshold models corresponding to the plurality of temperature values. The model initialization unit 118 is further configured to determine maximum likelihood estimates of parameters of the threshold model and parameters of the temperature models corresponding to the threshold model considering threshold data for all temperature values. The threshold model is given by:

$$\Delta K_{th} = \Delta K_1^* \left[ \frac{1-R}{1-f(R)} \right]^{E1} / (1-A_0)^{E2}$$

where:

$E1 = (1+Rc_{th}^p), E2 = (1-R)c_{th}^p$, when $R > 0$ and $E1 = (1+Rc_{th}^m), E2 = (C_{th}^p - Rc_{th}^m)$, when $R < 0$.

In the equation of the threshold model, $\Delta K_1^*$ approximated as $\Delta K_1$ as R tends to 1. The parameter $\Delta K_1$ is referred herein as threshold stress intensity factor range parameter at a constant fatigue loading. The symbols $\alpha$, SR, $c^p_{th}$, $c^m_{th}$, are fitting constants. The parameter $c^p_{th}$ is referred herein as empirical fit constant with positive R ratio. The Newman's crack closure function $f(\ )$ is given by:

$f = \max(R, A_0 + A_1 R + A_2 R^2 + A_3 R^3), R \geq 0$ $f = A_0 + A_1 R, -2 \leq R \leq 0$ where:

$$A_0 = [0.825 - 0.34\alpha + 0.05\alpha^2] \cos\left(\frac{\pi}{2} S_{max}/\sigma_0\right)^{1/\alpha}$$

$$A_1 = (0.415 - 0.071\alpha) S_{max}/\sigma_0$$

$$A_2 = 1 - A_0 - A_1 - A_3$$

$$A_3 = 2A_0 + A_1 - 1.$$

The threshold model parameters $\Delta K_1$ (threshold stress intensity factor range parameter at a constant fatigue loading) and $c^p_{th}$ (empirical fit constant with positive R ratio) are modeled by corresponding temperature models. In one embodiment, threshold model parameter $\Delta K_1$ is modeled by a first polynomial model and the threshold parameter $c^p_{th}$ is modeled by a second polynomial model. Specifically, in one embodiment, the $\Delta K_1$ is modeled by a second order polynomial and the parameter $c^p_{th}$ is modeled by a zeroth order polynomial.

Further, the model initialization unit 118 is configured to fit a NASGRO model to fit the crack growth rate model. Specifically, the NASGRO model is given by:

$$\frac{da}{dN} = C\left[\left(\frac{1-f(R,\alpha,SR)}{1-R}\right)\Delta K\right]^m \frac{\left(1-\frac{\Delta K_{th}(R)}{\Delta K}\right)^p}{\left(1-\frac{K_{max}}{K_c}\right)^q}$$

where da/dN is the crack growth rate in the units of mm/cycle, $\Delta K$ is range of stress intensity factor range, and R is representative of a ratio of the minimum stress to the maximum stress in a fatigue loading. The model parameters of the NASGRO model are represented by C, m, p, q, and SR. Further, the symbol a is the plane-stress-plane-strain factor, SR is the stress ratio, p and q are asymptotic modifiers that model the shape of the curve in the threshold and the fatigue crack growth regions respectively. The parameter p is referred herein as shape modifier parameter for the threshold region. The symbols C and m determine the intercept and the slope of the Paris region. The function $f(R, \alpha\ SR)$ is the Newman's crack closure function that models the effect of crack tip plasticity on crack growth. The term $\Delta K_{th}$ the threshold value of $\Delta K$ and is a function of R. $K_{max}$ is the maximum stress intensity factor range and the $K_c$ is representative of fracture toughness.

The crack growth rate parameters C, p, m, are modeled as temperature models. In one embodiment, the crack growth rate parameters C, m, p are modeled by a third polynomial model, a fourth polynomial model and a fifth polynomial model respectively. Specifically, the intercept parameter C and the slope parameter m are modeled as linear models. Further, the shape modifier parameter p for the threshold region is modeled as zeroth order polynomial. The temperature models for the crack growth rate model parameters are given by:

$\log\{C(T)\} = \beta_1 + \beta_2 T$ $p(T) = \beta_3$ $m(T) = \beta_4 + \beta_5 T$ where C is representative of intercept of the Paris region, m is representative of slope of the Paris region, and p is a shape modifier parameter in the threshold region.

In one embodiment, the model initialization unit 118 is configured to fit a NASGRO model to the fracture data 108 at each temperature value using a least square technique. Then, parameters of temperature models corresponding to the NASGRO model are determined by the model initialization unit 118 based on least square crack growth rate models corresponding to the plurality of temperature values.

The optimizer unit 120 is communicatively coupled to the model initialization 118 unit and configured to perform a joint optimization of parameters of the crack growth rate model and parameters of the temperature model using a maximum likelihood optimization technique based on the initial estimates. It may be noted herein that one or more parameters of the crack growth model is represented by a corresponding temperature model having its own temperature model parameters. The optimizer unit 120 is also configured to determine a scatter parameter corresponding to residuals determined based on the optimized parameters and the fracture data. The optimizer unit 120 is further configured to provide the scatter parameter to the control unit to determine a life estimation of the component. In one embodiment, the optimizing unit 120 is configured to determine an optimal solution for parameters of the threshold model, parameters of a corresponding temperature model and the scatter parameter based on the first dataset using a maximum likelihood cost function. The model initialization unit 118 is further configured to determine maximum likelihood estimates of parameters of the threshold model and parameters of the temperature models corresponding to the threshold model considering threshold data for all temperature values.

The optimizer unit 120 is configured to consider maximum likelihood estimates for the threshold models, parameters of the temperature models corresponding to the threshold models, initial NASGRO models and the initial temperature models corresponding to the parameters of the crack growth rate model for initializing a joint maximum-likelihood optimization routine. The cost function of the optimization routine is given by:

$$\text{Max}(L(\theta)) = \text{Max}\left(\prod_{i=1}^{n} g(x_i, \theta)\right)$$

where $L(\theta)$ is the likelihood function and $g(\ )$ is probability density function of a residual $x_i$ for a given parameter set $\theta$. The parameter set $\theta$ is given by parameters of the temperature models of the crack growth rate model as:

$\theta = \{\beta_1, \beta_2, \beta_3, \beta_4, \beta_5, \sigma\}$

The residual $x_i$ is given by:

$$x_i = A_i / P_i = \frac{\left(\frac{da}{dN}\right)_{actual}}{\left(\frac{da}{dN}\right)_{predicted}} \text{ where:}$$

$$\frac{da}{dN_{predicted}} = C(T)\left[\left(\frac{1 - f(R, \propto (T), SR(T))}{1 - R}\right)\Delta K\right]^{m(T)} \frac{\left(1 - \frac{\Delta K_{th(R)}}{\Delta K}\right)^{p(T)}}{\left(1 - \frac{K_{max}}{K_c}\right)^{q(T)}}.$$

Further, the optimizer unit 120 is configured to determine optimum parameters of the NASGRO model and an optimum value of the scatter parameter $\sigma$.

The control unit 116 is communicatively coupled to the memory unit 114 and configured to access memory locations for storing data to a memory unit 114 and retrieving data from the memory unit 114. The control unit 116 is further configured to determine an estimate of the crack growth rate based on parameters of the temperature models corresponding to the crack growth rate model and compute the optimized parameters of the threshold model. The control unit 116 is also configured to determine residuals based on the measured crack growth rate and the estimate of the crack growth rate. The determined residuals are modeled by a log-normal distribution with variance represented by the scatter parameter. The control unit 116 is also configured to modify parameters of the temperature models corresponding to the crack growth rate model to maximize cost function of the joint optimization.

In one embodiment, the control unit 116 is configured to provide residuals and corresponding scatter parameter for iterations of the joint optimization technique. The control unit 116 is also configured to perform fracture mechanics analysis to generate life estimate of the component based on the scatter parameter. In one particular embodiment, the control unit 116 may include one or more processors and configured to control the operation of the data acquisition unit, the memory unit, the model initialization unit and the optimizer unit. The one or more processors may be part (or perform the functions) of the data acquisition unit 112, the control unit 116, the model initialization unit 118, and the optimizer unit 120. The one or more processors may be one of a microprocessor, a general-purpose processor, a digital signal processor, or a controller. The one or more processors may also be a special purpose processing element such as a field programmable gate array (FPGA), and an application specific integrated circuit (ASIC).

In specific embodiments, the memory unit 114 may include one or more read only memory (ROM) modules, random access memory (RAM) modules, programmable ROM (PROM) modules, erasable ROM (EPROM) and electrically erasable PROM (EEPROM) modules. Specifically, the memory unit 114 may include one or more types of memory modules and the memory modules may be part of various units 112, 116, 118, and 120.

Figure 2:
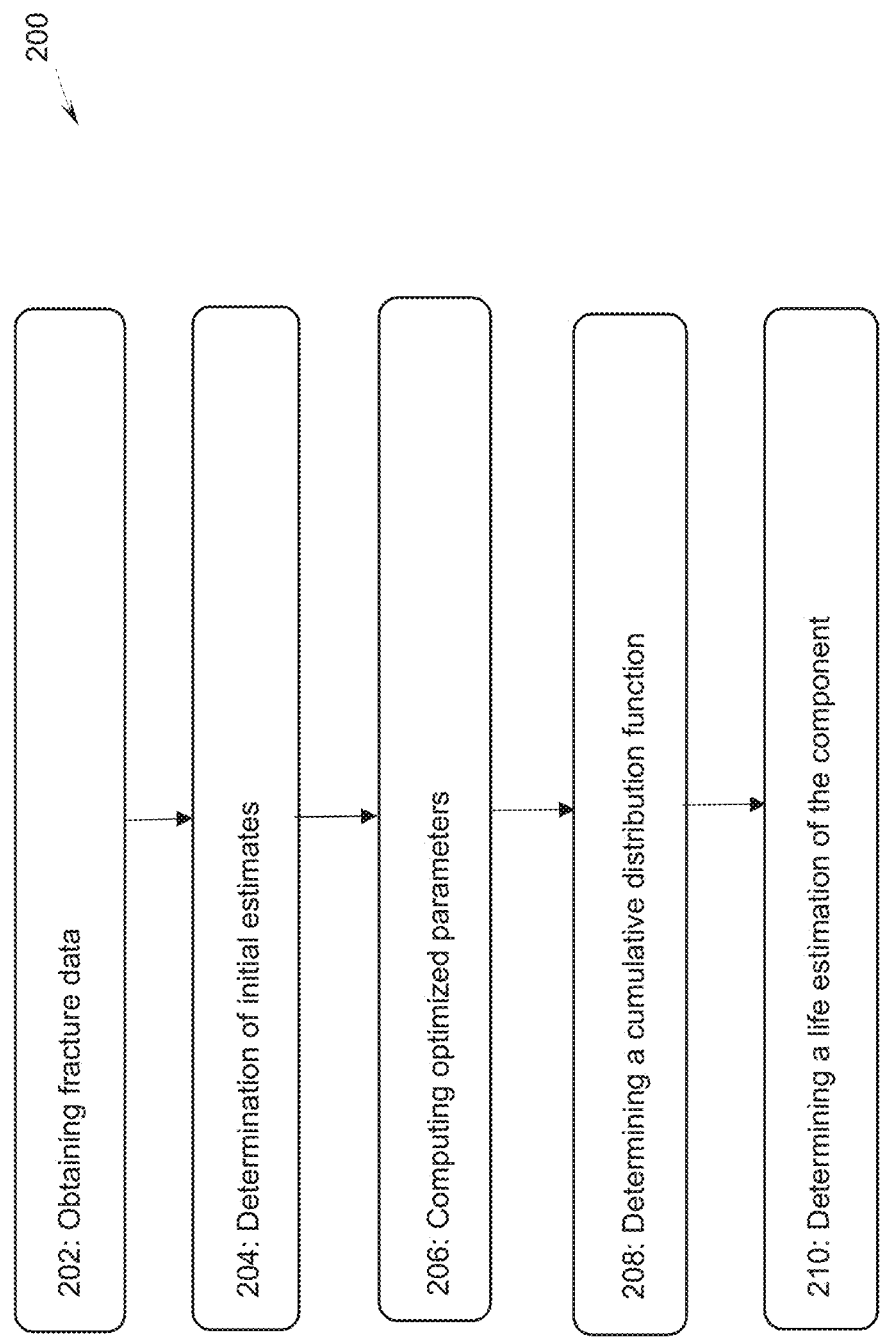
FIG. 2 is a flow chart of a method for estimating life of a component of a system in accordance with an exemplary embodiment.

FIG. 2 is a flow chart of a method 200 for estimating life of a component of a system in accordance with an exemplary embodiment. The method 200 includes obtaining 202, via a sensor, fracture data corresponding to a component. The fracture data includes first dataset corresponding to the threshold region and a second dataset corresponding to fatigue crack growth region. The fracture data is representative of crack growth rate in the component as a function of stress intensity factor range for a plurality of temperature values. In one embodiment, the act 202 of obtaining includes generating fracture data by performing a fracture test. The fracture data generated by the fracture test is measured at least one of a strain gauge sensor, a pressure sensor, and a displacement sensor.

The method 200 further includes determining 204 initial estimates of parameters of a crack growth rate model and a corresponding temperature model based on the second dataset. In one embodiment, the initial estimates for the parameters of the crack growth rate model is determined based on the second dataset. Further, initial parameters of the temperature model corresponding to the one or more parameters of the crack growth rate model is determined based on the initial estimates for the parameters of the crack growth rate model at various temperatures. The act 204 of determining an initial estimate also includes determining a least squares solution for parameters of the threshold model based on the first dataset. A temperature model corresponding to the threshold model is also determined based on least squares solution using the initial estimate of the threshold model. In one embodiment, the temperature model corresponding to one of the parameters of the threshold model is a second order polynomial model. Further, the act 204 of determining the initial estimate includes determining a least squares solution for the crack growth rate model based on the second dataset. In one embodiment, the crack growth rate model is a NASGRO model. Further, in the embodiments of the present specification, a temperature model corresponding to one or more parameters of the crack growth rate model is also determined. In one embodiment, the temperature model corresponding to one of the parameters of the crack growth rate model includes a linear model.

The method 200 also includes computing 206 optimized parameters of temperature models corresponding to the crack growth rate model, and a scatter parameter based on the initial estimates. In one embodiment, the act of 206 is performed via a joint optimization of parameters of the crack growth rate model, parameters of the corresponding temperature model and the scatter parameter using a maximum likelihood optimization technique based on the initial estimates. In one embodiment, the act 206 may also include computing an optimal solution for parameters of the threshold model, and parameters of the corresponding temperature model based on the first dataset using a maximum likelihood cost function.

The method 200 further includes performing Monte Carlo simulations based on the optimized parameters and the fracture data. In one embodiment, performing the Monte Carlo simulations includes determining a probabilistic quantification for life of the component. In one embodiment, the probabilistic quantification is a probabilistic risk-prediction of component failure due to fatigue-crack growth. Specifically, the method 200 includes determining 208 a cumulative distribution function as the probabilistic risk based on the optimized parameters and the scatter parameter. The method 200 also includes determining 210 a life estimation of the component based on the cumulative distribution function and the scatter parameter.

Figure 2A:
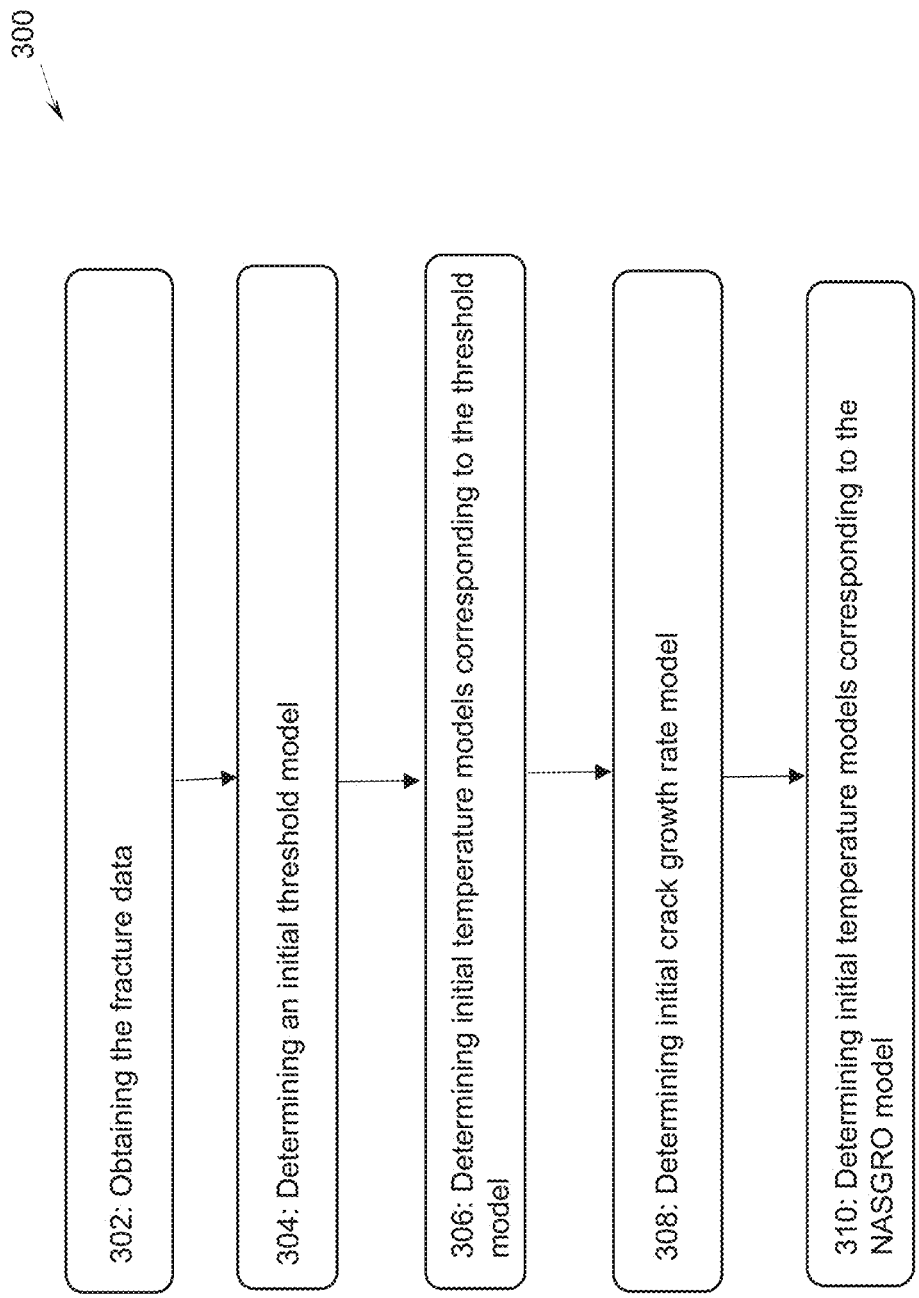
FIG. 2A is a flow chart of a method for determining initial models required for performing optimization in accordance with an exemplary embodiment.

FIG. 2A is a flow chart of a method 300 for determining initial estimates of models required for performing optimization in accordance with an exemplary embodiment. The method 300 is initiated after the fracture data is obtained as illustrated in act 302. As explained previously with reference to the previous figures, the fracture data includes a first dataset corresponding to the threshold region and the second dataset corresponding to the fatigue crack growth region. The method 300 further includes determining 304 an initial threshold model is determined based on the first dataset representative of threshold data corresponding to a specific temperature value. Similarly, a plurality of threshold models may be determined based on fracture data from the first dataset corresponding to the plurality of temperature values. The initial temperature model corresponding to the threshold models may be determined using a least squares regression technique as illustrated in act 306. The initial threshold models and the initial temperature models are used to initialize the joint maximum likelihood optimization act 206 of FIG. 1. In another embodiment, the initial threshold models and the initial temperature models are used to determine corresponding maximum likelihood estimates (MLE) are determined at act 306. Further, the MLE estimates are used to initialize the joint maximum likelihood optimization at act 206 of FIG. 1.

In act 308, an initial crack growth rate model (e.g., NASGRO model) is determined based on fracture data from the fracture data for a specific temperature value. Similarly, a plurality of NASGRO models may be determined based on fracture data from the fracture data corresponding to the plurality of temperature values. The initial temperature model corresponding to the NASGRO models may be determined using a least squares regression technique as illustrated in act 310. The initial NASGRO models and the initial temperature models are used to initialize the joint maximum likelihood optimization act 206 of FIG. 1.

Figure 3:
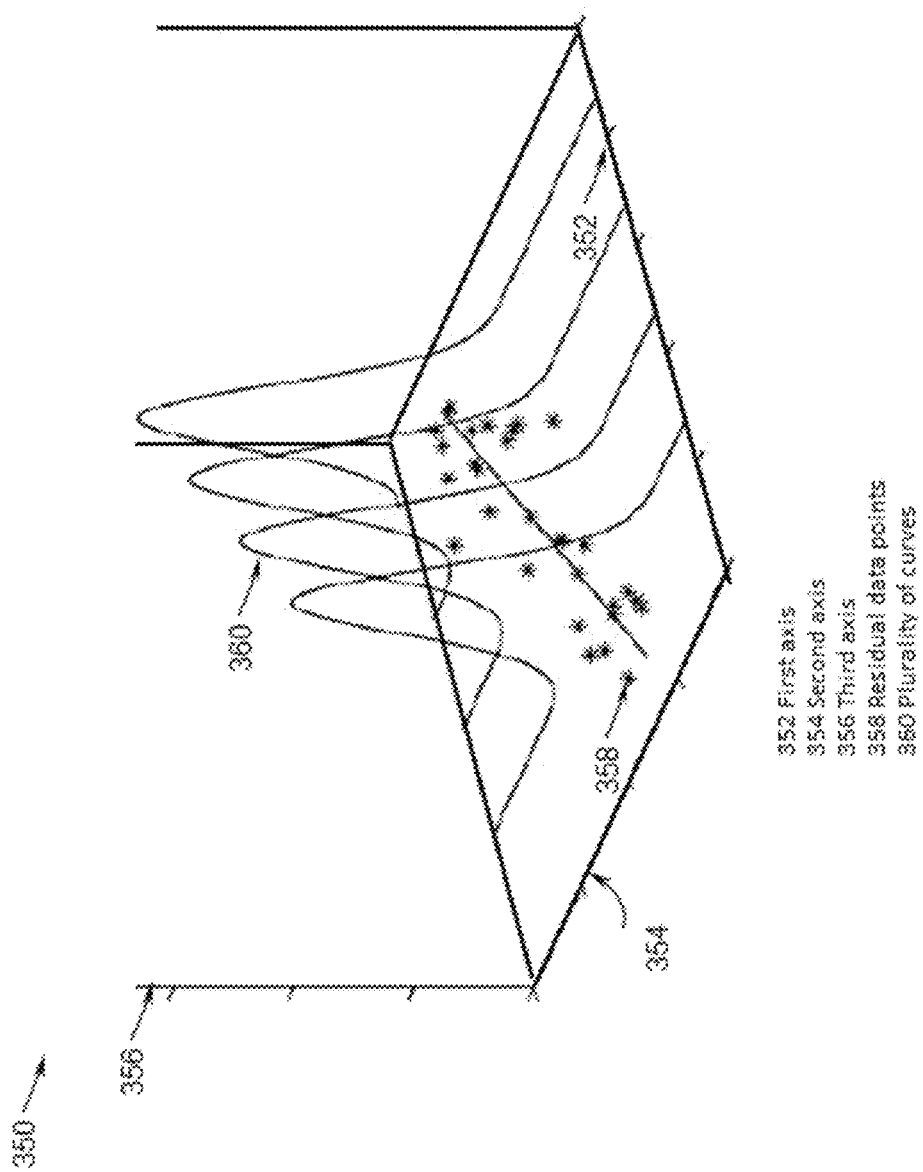
FIG. 3 is a Gaussian model for the measurement data in accordance with a prior art technique.

FIG. 3 is a graph 350 illustrating a Gaussian model for representing residual corresponding to the fracture crack growth data in accordance with a prior art technique. The graph 350 is a multidimensional graph with a plurality of independent variables. In the illustrated embodiment, the graph 350 has two independent variables represented by a first axis 352 and a second axis 354. The graph 350 also includes a dependent variable represented by a third axis 356 representative of probability density function value. The graph 350 includes a plurality of residual data points 358 and a plurality of curves 360 fitting the plurality of residual data points 358. It may be noted herein that the plurality of curves 360 are Gaussian curves modeling the distribution of the residual data points 358.

Figures 4A, 4B:
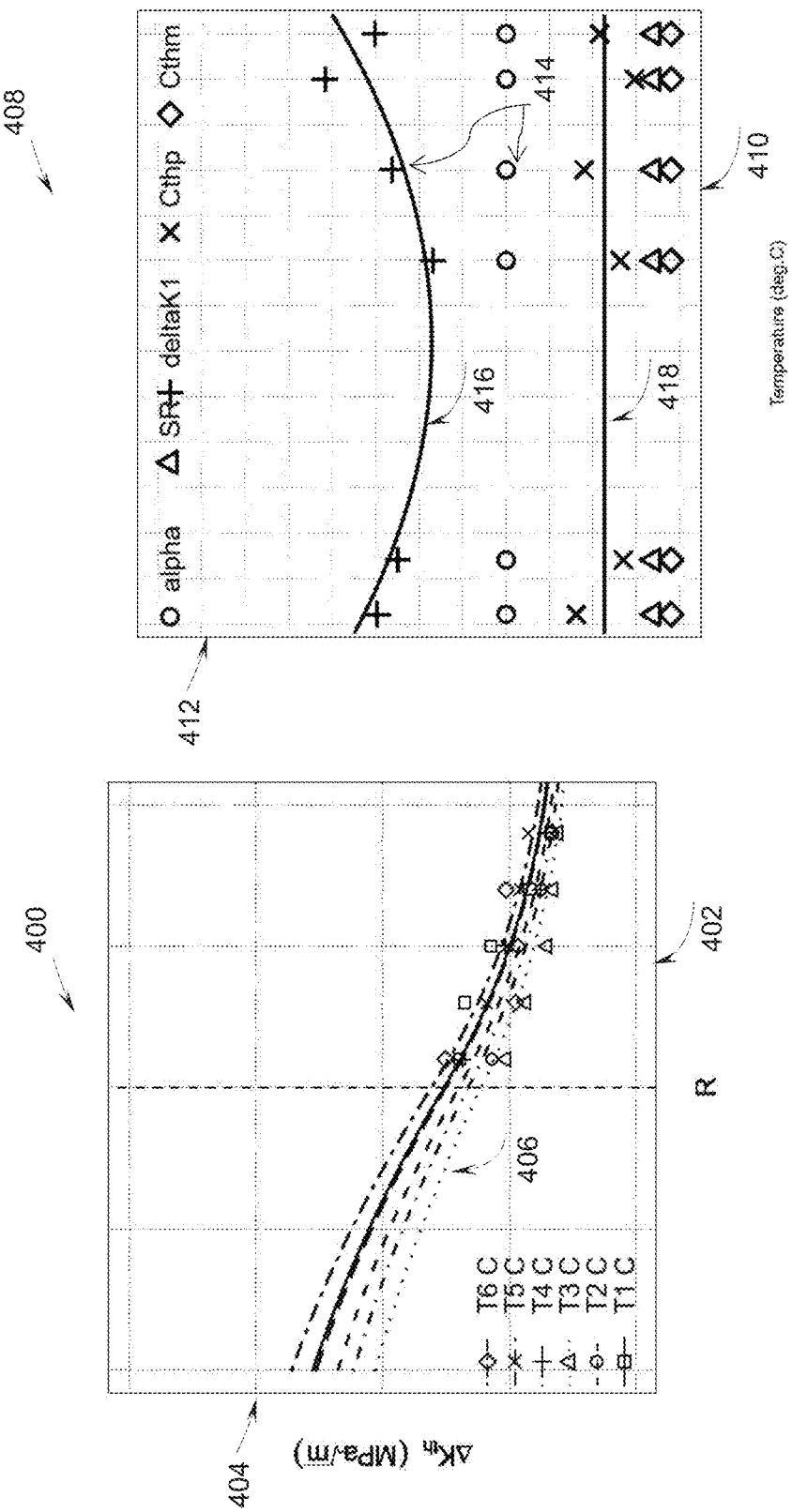
FIG. 4A is a graph illustrating threshold models in accordance with an exemplary embodiment.
FIG. 4B is a graph illustrating temperature model corresponding to the threshold model of FIG. 4A in accordance with an exemplary embodiment.

FIG. 4A is a graph 400 illustrating threshold models in accordance with an exemplary embodiment. The graph 400 illustrates a plurality of curves obtained from joint optimization of the parameters of the threshold model and parameters of the corresponding temperature model. The graph 400 includes an x-axis 402 representative of R-ratio values. The R-ratio referred herein is a ratio of the minimum stress to the maximum stress in a fatigue loading. The graph 400 also includes a y-axis 404 representative of threshold of stress intensity factor range. The plurality of curves 406 in the graph 400 corresponds to a plurality of temperature values. It may be observed that none of the plurality of curves 406 intersects with any of the other curves. The plurality of curves 406 of graph 400 demonstrates the beneficial effect of employing temperature model in determining the threshold models.

FIG. 4B is a graph 408 illustrating threshold temperature models in accordance with an exemplary embodiment. The graph 408 includes an x-axis 410 representative of temperature values in degrees and a y-axis 412 representative of magnitude of the parameter of the parameter of threshold models of FIG. 4A. The graph 408 includes a plurality of small circles 414 representative of data points corresponding to the plurality of parameter values corresponding to the plurality of temperature values. The graph 408 includes a first curve 416 representative of range of stress intensity factor under constant fatigue loading modeled as a second order polynomial. The curve 416 is representative of $\Delta K_1$ parameter of the threshold model. The graph 408 also includes a second curve 418 representative of empirical fit constant with positive R ratio. The second curve 418 which is representative of $c^p{}_{th}$ is modeled as a zeroth order polynomial.

Figure 5A:
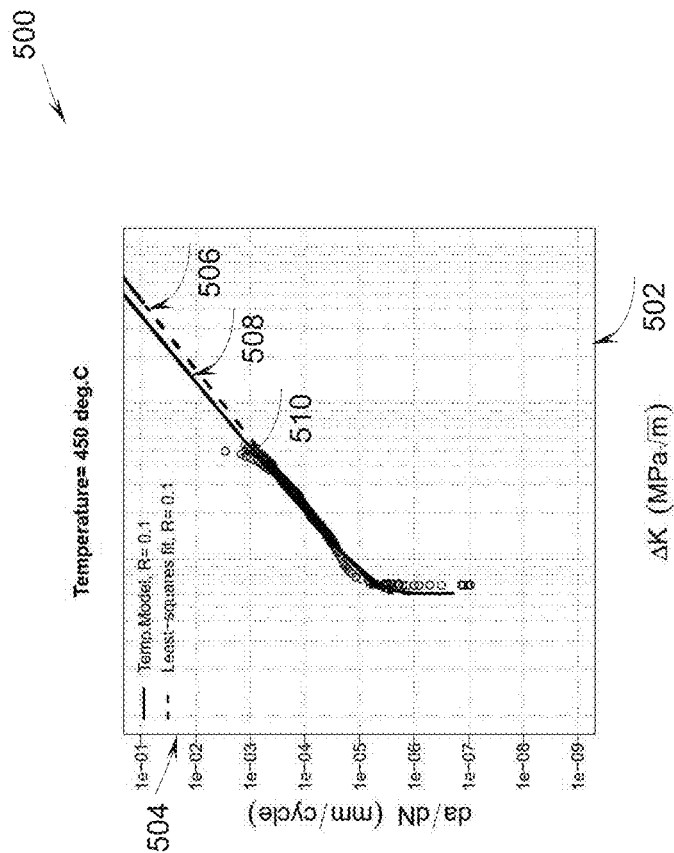
FIG. 5A is a graph illustrating superior performance of crack growth rate models in accordance with an exemplary embodiment.

FIG. 5A is a graph 500 illustrating superior performance of crack growth rate models in accordance with an exemplary embodiment. The graph 500 includes an x-axis 502 representative of stress intensity factor range. The graph 500 further includes a y-axis 504 representative of crack propagation rate. The graph 500 includes a first curve 506 representative of regression model for the crack growth rate. The graph 500 also includes a second curve 508 representative of a temperature model for the crack growth rate. It may be observed that the second curve 508 matches more closely with a plurality of dots 510 representative of data points of the crack growth rate in comparison with the first curve 506. The plurality of dots represents data points of the crack growth rate measured at four hundred and fifty degree centigrade. The temperature model disclosed herein and represented by the curve 508 exhibits superior performance in comparison with the regression model of the prior art and represented by the curve 506.

Figures 5B, 5C, 5D:
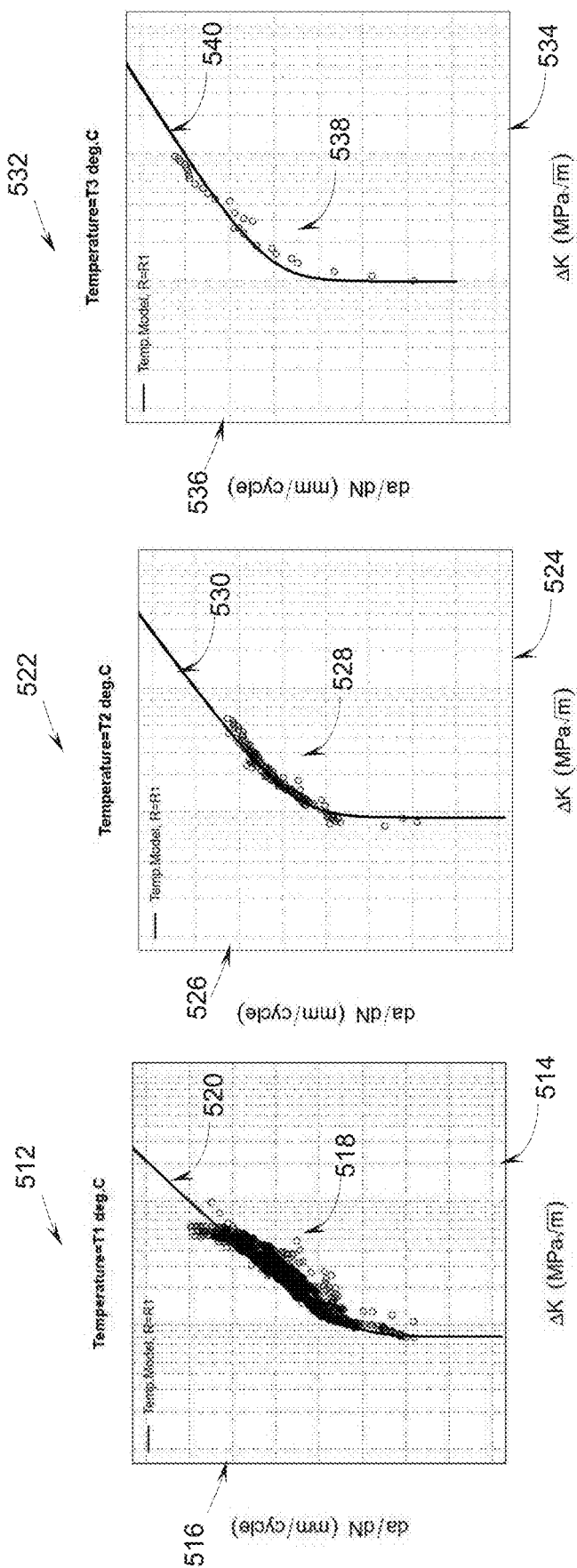
FIGS. 5B-5D are graphs illustrating performance of the crack growth rate models in accordance with an exemplary embodiment.

FIGS. 5B-5D are graphs illustrating performance of the crack growth rate models in accordance with an exemplary embodiment. FIG. 5B is a graph 512 representative of modeling of crack growth rate data at temperature of twenty degree centigrade. The graph 512 includes an x-axis 514 representative of stress intensity factor range and a y-axis 516 representative of crack propagation rate. The graph 512 includes a plurality of dots 518 representative of data points and a curve 520 representative of model corresponding to the data points 518. FIG. 5C is a graph 522 representative of modeling of crack growth rate data at temperature of four hundred sixty degree centigrade. The graph 522 includes an x-axis 524 representative of stress intensity factor range and a y-axis 526 representative of crack propagation rate. The graph 522 includes a plurality of dots 528 representative of data points and a curve 530 representative of model corresponding to the data points 528. FIG. 5D is a graph 532 representative of modeling of crack growth rate data at temperature of six hundred degree centigrade. The graph 532 includes an x-axis 534 representative of stress intensity factor range and a y-axis 536 representative of crack propagation rate. The graph 532 includes a plurality of dots 538 representative of data points and a curve 540 representative of model corresponding to the data points 538. The graphs 512, 522, 532 illustrate superior performance of crack growth rate models of the present specification.

Figure 6:
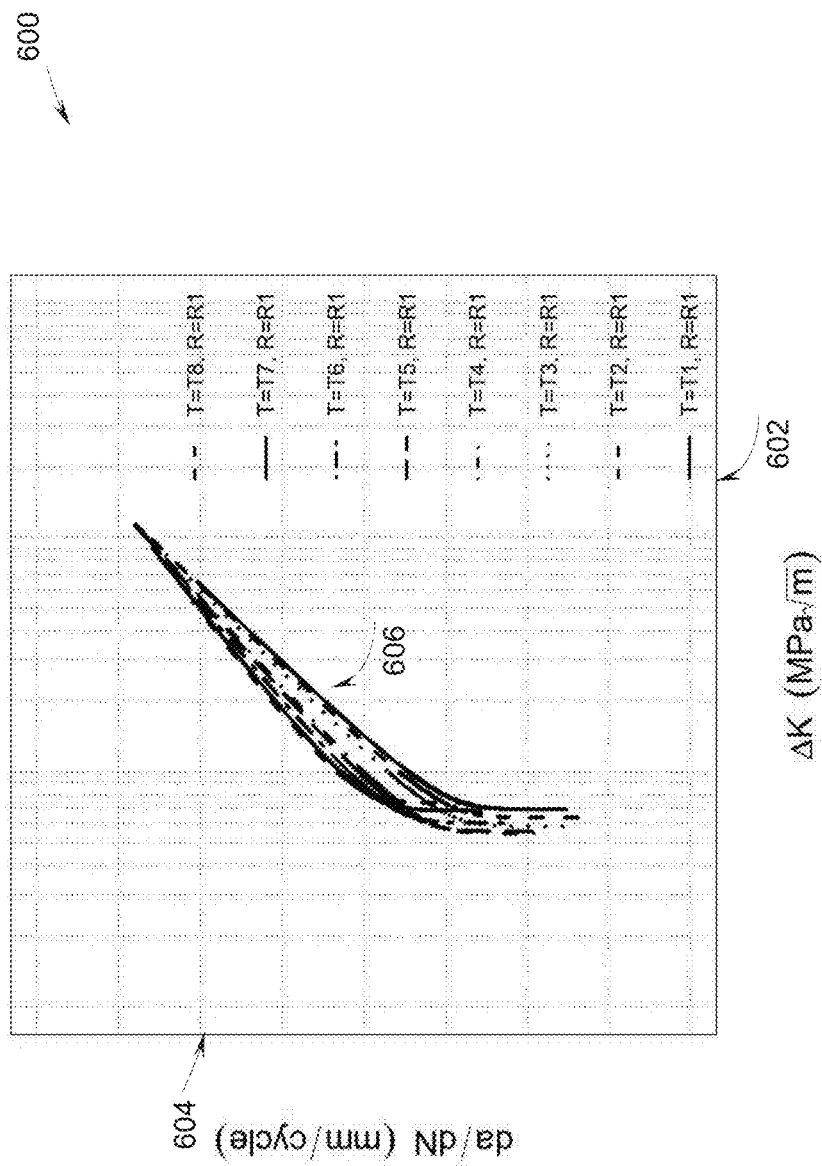
FIG. 6 is a graph illustrating crack growth rate model in accordance with an exemplary embodiment.

FIG. 6 is a graph 600 illustrating crack growth rate model in accordance with an exemplary embodiment. The graph 600 illustrates a plurality of crack growth rate curves 606 corresponding to the plurality of NASGRO curves. The graph 600 includes an x-axis 602 representative of stress intensity factor range. The graph 600 also includes a y-axis 604 representative of crack growth rate in millimeter per cycle units. The plurality of curves 606 corresponds to a plurality of temperature values. It may be observed that none of the plurality of curves intersects with any of the other curves in the Paris region. The parameters m and log(C) are modeled using linear temperature models and the p parameter has been modeled with a zeroth order polynomial model.

Figures 7A, 7B:
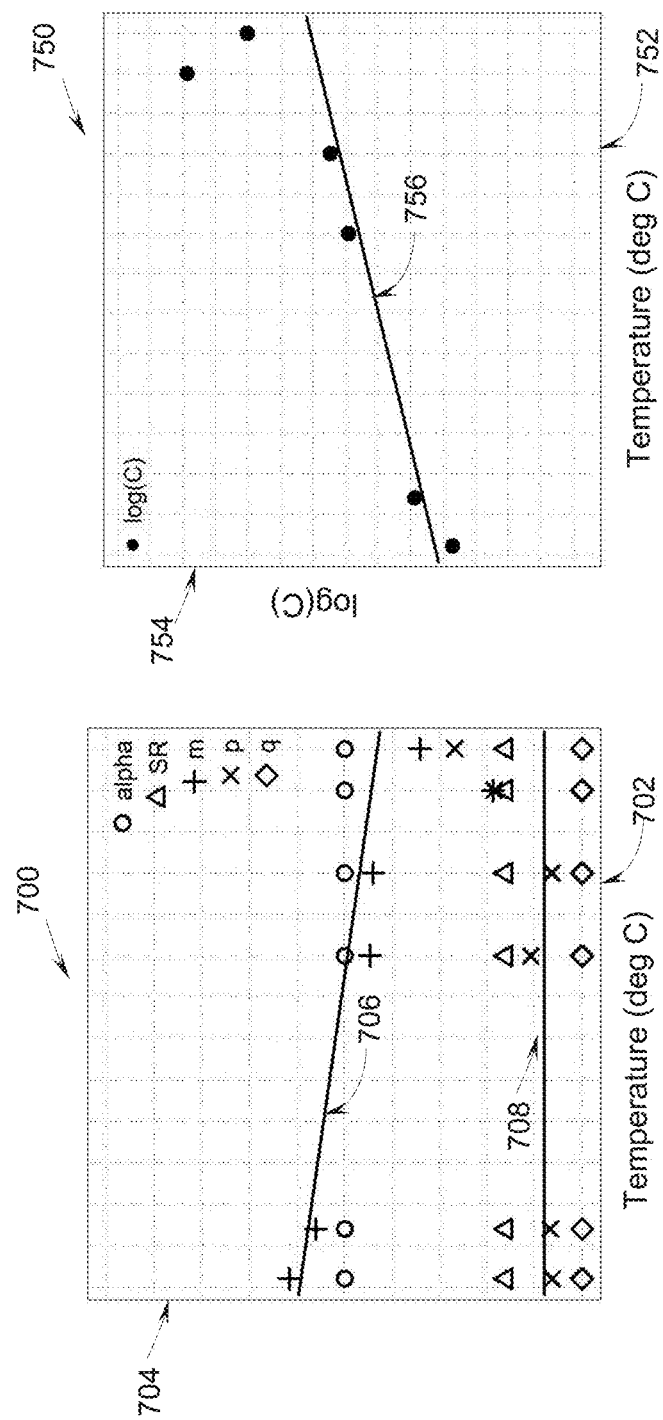
FIGS. 7A and 7B are graphs illustrating temperature models corresponding to the crack growth model of FIG. 6 in accordance with an exemplary embodiment.

FIG. 7A is a graph 700 illustrating temperature models for parameters of crack growth rate model in accordance with an exemplary embodiment. The graph 700 includes an x-axis 702 representative of temperature values. The graph 700 also includes a y-axis 704 representative of parameter values. The graph 700 includes a first curve 706 representative of a temperature model corresponding to a first parameter of the crack growth rate model. The curve 706 is representative of slope parameter of the crack growth rate model. The graph 700 also includes a second curve 708 representative of a temperature model corresponding to a second parameter of the crack growth rate model. The cure 708 is representative of shape modifier parameter for the threshold region.

FIG. 7B is a graph 750 illustrating temperature models for a parameter of crack growth rate model in accordance with an exemplary embodiment. The graph 750 includes an x-axis 752 representative of temperature values. The graph 750 also includes a y-axis 754 representative of parameter values. The graph 750 includes a third curve 756 representative of a temperature model corresponding to a third parameter of the crack growth rate model. The curve 756 is representative of intercept parameter of the crack growth rate model.

FIG. 8A is a graph 800 illustrating residual as a function of stress intensity factor range in accordance with an exemplary embodiment. The graph 800 includes an x-axis 802 representative of stress intensity factor range and a y-axis 804 representative of residuals of the crack growth rate. The term 'residual' represented on y-axis 804 is computed based on the crack growth rate obtained from the data and estimate of the crack growth rate obtained from the NASGRO model. Specifically, in the illustrated embodiment, the residual is determined as a ratio of the crack growth rate and the estimate. The graph 800 includes a plurality of datasets 806 corresponding to a plurality of temperature values. The dataset 806 includes residual values corresponding to eight values of temperatures.

FIG. 8B is a graph 850 illustrating probability density for the residuals of FIG. 8A determined in accordance with an exemplary embodiment. The graph 850 includes an x-axis 852 representative of residuals determined with reference to a crack growth rate dataset and a NASGRO model. The graph 850 also includes a y-axis 854 representative of probability density values. The graph 850 includes a curve 856 representative of a probability density function model for the plurality of residual values. It may be noted that the probability density function of curve 856 is a log-normal function.

Embodiments of the present specification disclose a joint optimization technique for determining optimum parameters of the crack growth rate model and scatter parameter of residuals corresponding to the crack growth rate model. The scatter parameter obtained from the disclosed technique is mathematically elegant and provide accurate life estimates of components for which models are developed. Simultaneous use of temperature models along with crack growth rate models enable use of limited data for determining the scatter parameter and avoid the crossing of model curves corresponding to a plurality of temperature values. Interpolation of missed data points may not be required from the models disclosed herein.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description but is only limited by the scope of the appended claims.

The invention claimed is:

1. A method for estimating a life of a component, the method comprising:

obtaining fracture data corresponding to the component, wherein the fracture data comprises a first dataset corresponding to a threshold region where a crack in the component is dormant below a fatigue threshold, and wherein the fracture data is representative of a crack growth rate in the component;

determining initial estimates of parameters of a crack growth rate model and parameters of temperature models corresponding to the crack growth rate model based on the fracture data;

computing optimized parameters of temperature models corresponding to the crack growth rate model, and a scatter parameter based on the initial estimates, wherein the computing of the optimized parameters comprises performing a simulation to implement a joint optimization by: determining an estimate of the crack growth rate based on the parameters of the temperature models corresponding to the crack growth rate model and parameters of a threshold model; determining residuals based on a measured crack growth rate and the estimate of the crack growth rate, wherein the determined residuals is modeled by a log-normal distribution with variance represented by the scatter parameter; and modifying the parameters of the temperature models corresponding to the crack growth rate model to maximize cost function of the joint optimization;

determining a cumulative distribution function based on the optimized parameters and the scatter parameter, wherein the cumulative distribution function is representative of a probability of failure of the component; and estimating the life of the component based on the cumulative distribution function.

2. The method of claim 1, wherein the cumulative distribution function is determined based on Monte Carlo simulations.

3. The method of claim 1, wherein the obtaining of the fracture data comprises performing fracture tests on a test specimen, wherein the test specimen is a sample material of the component.

4. The method of claim 1, wherein the determining of the initial estimates comprises determining a least squares solution for the parameters of the threshold model and a least square solution for the parameters of temperature models corresponding to the threshold model based on the first dataset.

5. The method of claim 4, wherein the determining of the initial estimates comprises determining a maximum likelihood estimation of the parameters of the temperature models corresponding to the threshold model.

6. The method of claim 1, wherein the determining of the initial estimates comprises determining a least squares solution for the crack growth rate model based on the fracture data.

7. The method of claim 1, wherein the optimized parameters are maximum likelihood estimates.

8. The method of claim 1, wherein the temperature models corresponding to the threshold model comprise a first polynomial model for a threshold stress intensity factor range parameter at a constant fatigue loading and a second polynomial model for an empirical fit constant with positive R ratio.

9. A method for estimating a life of a component, the method comprising:

obtaining fracture data corresponding to the component, wherein the fracture data comprises a first dataset corresponding to a threshold region where a crack in the component is dormant below a fatigue threshold, and wherein the fracture data is representative of a crack growth rate in the component;

determining initial estimates of parameters of a crack growth rate model and parameters of temperature models corresponding to the crack growth rate model based on the fracture data;

computing optimized parameters of temperature models corresponding to the crack growth rate model, and a scatter parameter based on the initial estimates;

determining a cumulative distribution function based on the optimized parameters and the scatter parameter, wherein the cumulative distribution function is representative of a probability of failure of the component; and estimating the life of the component based on the cumulative distribution function, wherein the temperature models corresponding to a threshold model comprise a first polynomial model for a threshold stress intensity factor range parameter at a constant fatigue loading and a second polynomial model for an empirical fit constant with positive R ratio.

10. The method of claim 9, wherein the computing of the optimized parameters comprises performing a simulation to implement a joint optimization.

11. The method of claim 10, wherein the computing of the optimized parameters comprises:

determining an estimate of the crack growth rate based on the parameters of the temperature models corresponding to the crack growth rate model and parameters of the threshold model;

determining residuals based on a measured crack growth rate and the estimate of the crack growth rate, wherein the determined residuals is modeled by a log-normal distribution with variance represented by the scatter parameter; and modifying the parameters of the temperature models corresponding to the crack growth rate model to maximize cost function of the joint optimization.

12. An apparatus for estimating a life of a component, the apparatus comprising:

one or more processing units; and a memory unit communicatively coupled to the one or more processing units, wherein the memory unit comprises one or more code modules stored in a form of machine-readable instructions executable by the one or more processing units, wherein the one or more code modules are configured to:

obtain fracture data corresponding to the component, wherein the fracture data comprises a first dataset corresponding to a threshold region where a crack in the component is dormant below a fatigue threshold, and wherein the fracture data is representative of a crack growth rate in the component;

determine initial estimates of parameters of a crack growth rate model and parameters of temperature models corresponding to the crack growth rate model based on the fracture data;

compute optimized parameters of temperature models corresponding to the crack growth rate model, and a scatter parameter based on the initial estimates, wherein the computation of the optimized parameters comprises a simulation to implement a joint optimization by: a determination of an estimate of the crack growth rate based on the parameters of the temperature models corresponding to the crack growth rate model and parameters of a threshold model; a determination of residuals based on a measured crack growth rate and the estimate of the crack growth rate, wherein the determined residuals is modeled by a log-normal distribution with variance represented by the scatter parameter; and a modification of the parameters of the temperature models corresponding to the crack growth rate model to maximize cost function of the joint optimization;

determine a cumulative distribution function based on the optimized parameters and the scatter parameter, wherein the cumulative distribution function is representative of a probability of failure of the component; and estimate the life of the component based on the cumulative distribution function.

13. The apparatus of claim 12, wherein the temperature models corresponding to the threshold model comprise a first polynomial model for a threshold stress intensity factor range parameter at a constant fatigue loading and a second polynomial model for an empirical fit constant with positive R ratio.

14. A system for estimating a life of a component, the system comprising:

one or more sources capable of providing fracture data corresponding to a component; and an apparatus communicatively coupled to the one or more sources, wherein the apparatus comprises one or more processing units and a memory unit communicatively coupled to the one or more processing units, wherein the apparatus is configured to:

obtain the fracture data corresponding to the component, wherein the fracture data comprises a first dataset corresponding to a threshold region where a crack in the component is dormant below a fatigue threshold, and wherein the fracture data is representative of a crack growth rate in the component;

determine initial estimates of parameters of a crack growth rate model and parameters of temperature models corresponding to the crack growth rate model based on the fracture data;

compute optimized parameters of temperature models corresponding to the crack growth rate model, and a scatter parameter based on the initial estimates, wherein the computation of the optimized parameters comprises a simulation to implement a joint optimization by: a determination of an estimate of the crack growth rate based on the parameters of the temperature models corresponding to the crack growth rate model and parameters of a threshold model; a determination of residuals based on a measured crack growth rate and the estimate of the crack growth rate, wherein the determined residuals is modeled by a log-normal distribution with variance represented by the scatter parameter; and a modification of the parameters of the temperature models corresponding to the crack growth rate model to maximize cost function of the joint optimization;

determine a cumulative distribution function based on the optimized parameters and the scatter parameter, wherein the cumulative distribution function is representative of a probability of failure of the component; and estimate the life of the component based on the cumulative distribution function.

15. The system of claim 14, wherein the temperature models corresponding to the threshold model comprise a first polynomial model for a threshold stress intensity factor range parameter at a constant fatigue loading and a second polynomial model for an empirical fit constant with positive R ratio.

16. A computer-program product having machine-readable instructions stored therein, which when executed by one or more processing units, causes the one or more processing units to:

obtain fracture data corresponding to a component, wherein the fracture data comprises a first dataset corresponding to a threshold region where a crack in the component is dormant below a fatigue threshold, and wherein the fracture data is representative of a crack growth rate in the component;

determine initial estimates of parameters of a crack growth rate model and parameters of temperature models corresponding to the crack growth rate model based on the fracture data;

compute optimized parameters of temperature models corresponding to the crack growth rate model, and a scatter parameter based on the initial estimates, wherein the computation of the optimized parameters comprises a simulation to implement a joint optimization by: a determination of an estimate of the crack growth rate based on the parameters of the temperature models corresponding to the crack growth rate model and parameters of a threshold model; a determination of residuals based on a measured crack growth rate and the estimate of the crack growth rate, wherein the determined residuals is modeled by a log-normal distribution with variance represented by the scatter parameter; and a modification of the parameters of the temperature models corresponding to the crack growth rate model to maximize cost function of the joint optimization;

determine a cumulative distribution function based on the optimized parameters and the scatter parameter, wherein the cumulative distribution function is representative of a probability of failure of the component; and estimate a life of the component based on the cumulative distribution function.

17. The computer-program product of claim 16, wherein the temperature models corresponding to the threshold model comprise a first polynomial model for a threshold stress intensity factor range parameter at a constant fatigue loading and a second polynomial model for an empirical fit constant with positive R ratio.

18. A method for estimating a life of a component, the method comprising:

obtaining fracture data corresponding to the component, wherein the fracture data comprises a first dataset corresponding to a threshold region where a crack in the component is dormant below a fatigue threshold, and wherein the fracture data is representative of a crack growth rate in the component;

determining initial estimates of parameters of a crack growth rate model and parameters of temperature models corresponding to the crack growth rate model based on the fracture data;

computing optimized parameters of temperature models corresponding to the crack growth rate model, and a scatter parameter based on the initial estimates;

determining a cumulative distribution function based on the optimized parameters and the scatter parameter, wherein the cumulative distribution function is representative of a probability of failure of the component; and estimating the life of the component based on the cumulative distribution function, wherein the determining of the initial estimates comprises: (1) determining a least squares solution for parameters of a threshold model and a least square solution for parameters of temperature models corresponding to the threshold model based on the first dataset; or (2) determining a least squares solution for the crack growth rate model based on the fracture data.

* * * * *